(12) United States Patent
Kadosh et al.

(10) Patent No.: US 11,558,310 B2
(45) Date of Patent: Jan. 17, 2023

(54) LOW-LATENCY DELIVERY OF IN-BAND TELEMETRY DATA

(71) Applicant: MELLANOX TECHNOLOGIES, LTD., Yokneam (IL)

(72) Inventors: Matty Kadosh, Hadera (IL); Yuval Shpigelman, Netanya (IL); Omer Shabtai, Tel Aviv (IL); Yonatan Piasetsky, Tel Aviv (IL); Aviv Kfir, Nili (IL); Alan Lo, Boulder, CO (US); Marian Pritsak, Issaquah, WA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/348,801

(22) Filed: Jun. 16, 2021

(65) Prior Publication Data
US 2022/0407814 A1 Dec. 22, 2022

(51) Int. Cl.
*H04L 47/6275* (2022.01)
*H04L 43/106* (2022.01)
*H04L 43/0888* (2022.01)
*H04L 47/62* (2022.01)
(Continued)

(52) U.S. Cl.
CPC ...... *H04L 47/6275* (2013.01); *H04L 43/0888* (2013.01); *H04L 43/10* (2013.01); *H04L 43/106* (2013.01); *H04L 47/263* (2013.01); *H04L 47/6215* (2013.01)

(58) Field of Classification Search
CPC ....... H04L 43/0876–0894; H04L 43/10; H04L 43/106; H04L 43/12; H04L 47/18; H04L 47/26; H04L 47/263; H04L 47/267; H04L 47/6215; H04L 47/6275
See application file for complete search history.

(56) References Cited

U.S. PATENT DOCUMENTS

| 10,938,722 B2 | 3/2021 | Sankaran et al. |
| 2020/0412658 A1 | 12/2020 | Kumar et al. |
| 2021/0306246 A1* | 9/2021 | Jacob Da Silva .. H04L 41/0816 |

(Continued)

OTHER PUBLICATIONS

Li et al., "HPCC: High Precision Congestion Control," SIGCOMM '19: Proceedings of the ACM Special Interest Group on Data Communication, pp. 44-58, Aug. 19-23, 2019.

(Continued)

*Primary Examiner* — Pao Sinkantarakorn
(74) *Attorney, Agent, or Firm* — Kligler & Associates Patent Attorneys Ltd

(57) ABSTRACT

A network device includes processing circuitry and a plurality of ports. The ports connect to a communication network. The processing circuitry is configured to receive, via an input port, data packets and probe packets that are addressed to a common output port, to store the data packets in a first queue and the probe packets in a second queue, both the first queue and the second queue are served by the output port, to produce telemetry data indicative of a state of the network device, based on a processing path that the data packets traverse within the network device, to schedule transmission of the data packets from the first queue at a first priority, and schedule transmission of the probe packets from the second queue at a second priority higher than the first priority, and to modify the scheduled probe packets so as to carry the telemetry data.

21 Claims, 3 Drawing Sheets

(51) Int. Cl.
  *H04L 43/10*  (2022.01)
  *H04L 47/263*  (2022.01)

(56) References Cited

U.S. PATENT DOCUMENTS

2021/0365397 A1* 11/2021 Tanaka .................... G06F 3/061
2022/0086035 A1*  3/2022 Devaraj ............. H04L 43/0882
2022/0124035 A1*  4/2022 Lee ........................ H04L 41/34
2022/0210075 A1*  6/2022 Musleh ................ H04L 47/127
2022/0239575 A1*  7/2022 Arneja ................. H04L 43/067

OTHER PUBLICATIONS

Kumar et al., "Swift: Delay is Simple and Effective for Congestion Control in the Datacenter," SIGCOMM '20: Proceedings of the Annual Conference of the ACM Special Interest Group on Data Communication on the Applications, Technologies, Architectures, and Protocols for Computer Communication, pp. 514-528, Aug. 10-14, 2020.

Kim et al., "In-band Network Telemetry (INT)," pp. 1-28, Jun. 2016, as downloaded from https://p4.org/assets/INT-current-spec.pdf.

Miao et al., "HPCC++: Enhanced High Precision Congestion Control,- draft-pan-tsvwg-hpccplus-01," Internet-Draft, Internet Engineering Task Force (IETF), pp. 1-9, Jul. 29, 2020, as downloaded from https://tools.ietf.org/id/draft-pan-tsvwg-hpccplus-01.html).

* cited by examiner

LOW-LATENCY DELIVERY OF IN-BAND TELEMETRY DATA

TECHNICAL FIELD

Embodiments described herein relate generally to data communication, and particularly to methods and systems for low-latency delivery of in-band telemetry data.

BACKGROUND

In in-band telemetry, network devices report their states in packets traversing along a network path.

Methods for in-band telemetry are known in the art. For example, a paper by Yuliang Li et al., entitled "HPCC: High Precision Congestion Control," SIGCOMM '19: Proceedings of the ACM Special Interest Group on Data Communication, August 2019, Pages 44-58, describes a High Precision Congestion Control (HPCC) method, that leverages in-network telemetry (INT) to obtain precise link load information and controls traffic precisely.

HPCC is also described in a draft specification by the Internet Engineering Task Force (IETF), entitled "HPCC++: Enhanced High Precision Congestion Control, draft-pantsvwg-hpccplus-01," Jul. 29, 2020.

In a paper entitled "Swift: Delay is Simple and Effective for Congestion Control in the Datacenter," SIGCOMM '20: Proceedings of the Annual conference of the ACM Special Interest Group on Data Communication on the applications, technologies, architectures, and protocols for computer communication, July 2020, Pages 514-528, Gautam Kumar et al. report on experiences with Swift congestion control in Google datacenters. Swift targets an end-to-end delay by using Increase Multiplicative-Decrease (AIMD) control, with pacing under extreme congestion.

U.S. Pat. No. 10,938,722 describes an in-band telemetry congestion notification system that includes a source device that generates and transmits packets. Each of a plurality of switch devices receives each of the packets, provides in-band telemetry information in each of the packets, and transmits each of the packets to a destination device. When the destination device receives a first subset of the packets, it uses the in-band telemetry information included in each of the first subset of the packets to determine a telemetry information baseline. Subsequently to determining the telemetry information baseline, when the destination device receives a second subset of the packet, it uses the in-band telemetry information included in each of the second subset of the packets to determine a departure from the telemetry information baseline that indicates congestion and, in response, generates a congestion notification and transmits the congestion notification via the plurality of switch devices to the source device.

SUMMARY

An embodiment that is described herein provides a network device, including processing circuitry and a plurality of ports. The probes in the plurality of ports are configured to connect to a communication network. The processing circuitry is configured to receive, via an input port among the plurality of ports, data packets and probe packets that are addressed to a common output port among the plurality of ports, to store the data packets in a first queue and store the probe packets in a second queue different from the first queue, both the first queue and the second queue are served by the output port, to produce telemetry data indicative of a state of the network device, based on a processing path that the data packets traverse within the network device, to schedule transmission of the data packets from the first queue at a first priority, and schedule transmission of the probe packets from the second queue at a second priority higher than the first priority, and to modify one or more of the scheduled probe packets, so as to carry at least part of the telemetry data.

In some embodiments, the processing circuitry is configured to store in the second queue only probe packets and not data packets. In other embodiments, the processing circuitry is configured to produce the telemetry data by monitoring one or more performance attributes selected from a list including: ingress timestamps of the data packets, egress timestamps of the data packets, occupancy of the first queue, congestion status of the first queue, amount of data transmitted via the output port, and transmission rate via the output port. In yet other embodiments, the processing circuitry is configured to store the produced telemetry data in one or more registers, and to modify the probe packets based on the telemetry data stored in the one or more registers.

In an embodiment, the data packets and the probe packets originate from a source node upstream from the network device and addressed to a destination node downstream from the network device, and the processing circuitry is configured to add the produced telemetry data to the probe packets traversing a network path from the source node to the destination node. In another embodiment, the processing circuitry is configured to produce the telemetry data so as to be used by the source node for controlling a rate of injecting data into the communication network. In yet another embodiment, the processing circuitry is configured to be pre-provisioned with telemetry collection instructions, and to produce the telemetry data based on the telemetry collection instructions.

In some embodiments, the processing circuitry is configured to produce the telemetry data based on telemetry instructions carried in one or more of the received probe packets. In other embodiments, the processing circuitry is configured to modify a given probe packet among the one or more of the probe packets, by modifying the given probe packet while being transmitted toward the output port. In yet other embodiments, the processing circuitry is configured to modify a given probe packet among the one or more of the probe packets, by adding the telemetry data to a header part or to a payload part of the given packet.

There is additionally provided, in accordance with an embodiment that is described herein, a method, including, in a network device that includes a plurality of ports for connecting to a communication network, receiving, via an input port among the plurality of ports, data packets and probe packets that are addressed to a common output port among the plurality of ports. The data packets are stored in a first queue and the probe packets are stored in a second queue different from the first queue, both the first queue and the second queue are served by the output port. Telemetry data indicative of a state of the network device is produced based on a processing path that the data packets traverse within the network device. Transmission of the data packets from the first queue is scheduled at a first priority, and transmission of the probe packets from the second queue is scheduled at a second priority higher than the first priority. One or more of the scheduled probe packets are modified so as to carry at least part of the telemetry data.

There is additionally provided, in accordance with an embodiment that is described herein, a method, including, in a network device that connects to a communication network using ports, receiving, via an input port, data packets and probe packets that are addressed to a common output port. The data packets are stored in a data queue and the probe packets are stored in a probe queue, wherein both queues are served by the output port. Telemetry data reporting the state of the network device is produced based on a processing path that the data packets traverse in the network device from the input port to the output port. Transmission of the data packets from the data queue and of the probe packets from the probe queue so that the probe packets are transmitted via the output port at a higher priority than data packets. One or more of the scheduled probe packets are modified to carry at least part of the telemetry data.

These and other embodiments will be more fully understood from the following detailed description of the embodiments thereof, taken together with the drawings in which:

DETAILED DESCRIPTION OF EMBODIMENTS

Overview

Figure 1:
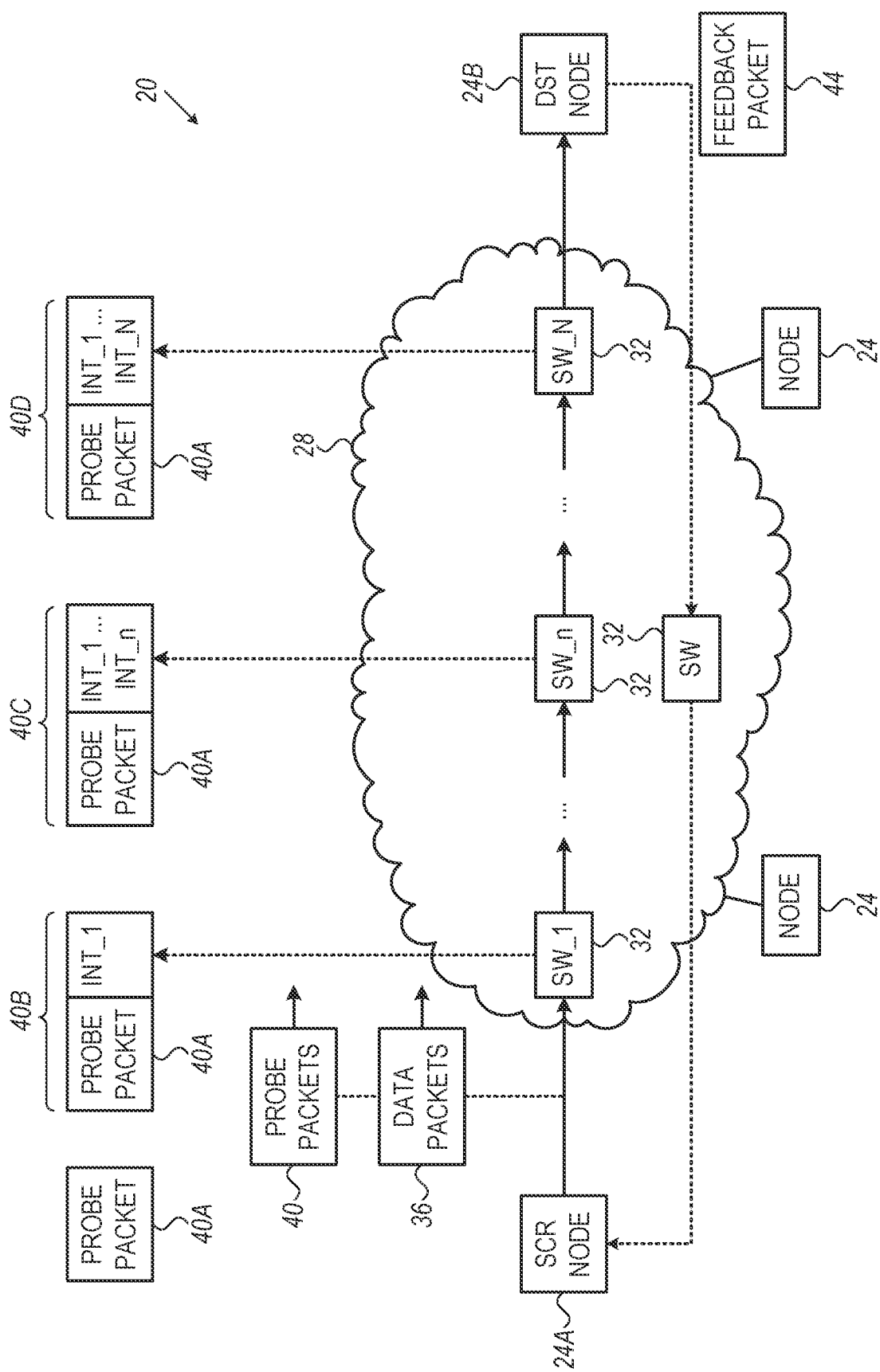
FIG. 1 is a block diagram that schematically illustrates a communication system supporting low-latency delivery of in-band telemetry data, in accordance with an embodiment that is described herein.

Embodiments that are described herein, provide improved methods and systems for delivery of in-band telemetry data.

High-speed communication networks are typically required to deliver high bandwidth traffic at ultra-low latencies. High speed networks are used, for example, in data centers that employ resource disaggregation and/or heterogeneous computing, in storage on high-speed I/O media, e.g., Non-Volatile Memory Express (NVMe), and in large-scale Machine Learning (ML) processing.

In applications that are based on high-speed networks, the network itself may become a performance bottleneck, e.g., due to congestion.

Telemetry data collected by network devices may be used for various purposes, e.g., for analyzing the network performance and resolving network bottlenecks, e.g., caused by network congestion.

In conventional in-band telemetry methods (e.g., as used in the HPCC method cited above), telemetry data is carried in probe packets that a sender node sends to a target node. The probe packets carry telemetry data collected accumulatively by network devices traversed along a path from the sender node to the target node. In using telemetry data for congestion control, the target node sends information derived from the telemetry data in the probe packets back to the sender node. Based on the feedback information, the sender node may adjust the rate of injecting data into the network, e.g., to relieve the congestion.

Conventionally, the probe packets traverse the same path in the network and are stored in the same queues as the data packets. For example, a guideline in the HPCC++ draft cited above states that HPCC++ can use a probe packet to query the in-band telemetry information, and thereby, the probe packets should take the same routing path and QoS queueing with the data packets. Probe packets that are queued together with data packets may therefore be transmitted with long delays when the queues fill up or become congested. Consequently, the feedback telemetry data may be received by the sender node at a long latency, which prevents the sender node from reacting quickly to congestion events.

In the disclosed techniques, probe packets carry telemetry data related to a processing path that data packets traverse within the network devices. Moreover, the probe packets are queued in dedicated queues separately from data packets. The queues serving the probe packets have higher priority than the queues serving the data packets, and therefore the probe packets are transmitted by the network devices with minimal delay.

Consider an embodiment of a network device that comprises processing circuitry and a plurality of ports. The ports are configured to connect to a communication network. The processing circuitry is configured to receive, via an input port among the plurality of ports, data packets and probe packets that are addressed to a common output port among the plurality of ports, to store the data packets in a first queue and store the probe packets in a second queue different from the first queue, wherein both the first queue and the second queue are served by the output port. The processing circuitry is further configured to produce telemetry data indicative of a state of the network device, based on a processing path that the data packets traverse within the network device, to schedule transmission of the data packets from the first queue at a first priority, and schedule transmission of the probe packets from the second queue at a second priority higher than the first priority, and to modify one or more of the scheduled probe packets, so as to carry at least part of the telemetry data.

In some embodiments, the processing circuitry is configured to store in the second queue only probe packets and not data packets, e.g., for minimizing the delay in transmitting the probe packets.

The processing circuitry may produce the telemetry data in any suitable way, e.g., by monitoring one or more performance attributes selected from a list comprising: ingress timestamps of the data packets, egress timestamps of the data packets, occupancy of the first queue, congestion status of the first queue, amount of data transmitted via the output port, and transmission rate via the output port.

In some embodiments, the processing circuitry adds the telemetry data to the probe packets by initially storing the telemetry data in one or more registers, and modifying the probe packets, at a later time, based on the telemetry data stored in the one or more registers.

In some embodiments, the data packets and the probe packets originate from a source node upstream from the network device and addressed to a destination node downstream from the network device, and the processing circuitry is configured to add the produced telemetry data to the probe packets traversing a network path from the source node to the destination node. In an embodiment, the processing circuitry is configured to produce the telemetry data so as to be used by the source node for controlling a rate of injecting data into the communication network.

Instructions for collecting the telemetry data may be provided in any suitable way. For example, in one embodiment the processing circuitry produces the telemetry data based on pre-provisioned telemetry collection instructions. In another embodiment, the processing circuitry is configured to produce the telemetry data based on telemetry instructions carried in one or more of the received probe packets.

In some embodiments, the processing circuitry modifies given probe packet while the given packet is being transmitted toward the output port. For example, the processing circuitry may add the telemetry data to a header part or to a payload part of the given packet.

In the disclosed techniques, probe packets are queued in different queues than data packets and are scheduled transmission to the network at a higher priority than the data packets. Consequently, a congested queue that stores data packets, does not delay the transmission of probe packets. Unlike conventional telemetry schemes in which probe packets can only carry telemetry data related to queues in which the probe packets are queued, in the disclosed embodiments, the probe packets carry telemetry data related to data packets that are queued in other queues.

SYSTEM DESCRIPTION

FIG. 1 is a block diagram that schematically illustrates a communication system 20 supporting low-latency delivery of in-band telemetry data, in accordance with an embodiment that is described herein.

In communication system 20, compute nodes 24 communicate with one another over a communication network 28 comprising multiple interconnected network devices 32. In the example of FIG. 1, a compute node 24A serves as a source node that sends data over communication network 28 to a compute node 24B serving as a destination node. A "compute node" is also referred to simply as "node" for brevity.

Network devices 32 may comprise any suitable type of network devices that receive and forward packets, such as, for example, network switches or routers. In the example of FIG. 1, network devices 32 comprise network switches, and the traffic sent from source node 24A to destination node 24B travers a path in the communication network, comprising N switches denoted SW_1 . . . SW_N.

Communication system 20 may be used in various applications that are based on high-bandwidth ultra-low latency networks such as, for example, in data centers, High-Performance Computing (HPC), high-speed remote storage, Machine Learning (ML) training, distributed computing, and the like.

In some disclosed embodiments, switches 32 capture in-band telemetry data that may be reported back to source node 24A. In addition to data packets 36, source node 24A sends to destination node 24B dedicated probe packets 40 for carrying in-band telemetry information produced by switches SW_1 . . . SW_N along the path from the source node to the destination node. A switch 32 that receives a data packet 36 or a probe packet 40 forwards the data packet or the probe packet to a suitable output port towards destination node 24B.

Source node 24A may schedule the transmission of probe packets to the network in any suitable way. For example, the source node may transmit to the destination node data packets and probe packets in a predefined average ratio between the data packets and the probe packets. In some embodiments, the source node sends at least one probe packet during a Round Trip Time (RTT) period. As another example, the source node may transmit a probe packet after a preset timeout has expired.

In some embodiments, switch 32 processes probe packets differently than data packets. In some embodiments, switch 32 identifies received probe packets, and adds to the probe packets telemetry data captured within the switch. In the example of FIG. 1, source node 24A sends toward destination node 24B a probe packet 40A that initially carries no telemetry data, and the switches along the path to the destination node cumulatively add to the probe packet telemetry data as described herein.

In the example depicted in FIG. 1, the first switch SW_1 adds to probe packet 40A telemetry data denoted INT_1 to produce an updated probe packet 40B, the $n^{th}$ switch SW_n ($1<n<N$) further adds to probe packet 40A telemetry data denoted INT_n to produce an updated probe packet 40C, and the last switch SW_N further adds to probe packet 40A telemetry data denoted INT_N to produce probe packet 40D. Probe packet 40D thus contains telemetry data INT_1 . . . INT_N contributed by respective switches SW_1 . . . SW_N along the path. The last switch SW_N forwards probe packet 40D to destination node 24B.

Although in the present example, all of the switches along the path contribute telemetry data to the probe packets, this is not mandatory. In alternative embodiments, a partial subset of the switches along the path may report telemetry data indicative of their states in the probe packets.

In some embodiments, in response to receiving a probe packet, e.g., probe packet 40D, destination node 24B sends a feedback packet 44 back to source node 24A over communication network 28. The feedback packet may travers the same or a different path in the communication network compared to the path traversed by the data packets and probe packets from the source node to the destination node. Feedback packet 44 may comprise, for example, the raw telemetry data contained in probe packet 40D. Alternatively, the feedback packet may comprise data derived from the telemetry data in probe packet 40D. For example, the destination node derives from the raw telemetry data, feedback data that is suitable to be used by source node 24A, wherein the feedback data has a much smaller volume than the raw telemetry data.

Source node 24A may act upon receiving feedback packet 44 in various ways. In an example embodiment, the source node adjusts its transmission rate toward the destination node based on the feedback data reported in one or more feedback packets.

A Network Device Supporting Low-Latency Delivery of In-Band Telemetry Data

Figure 2:
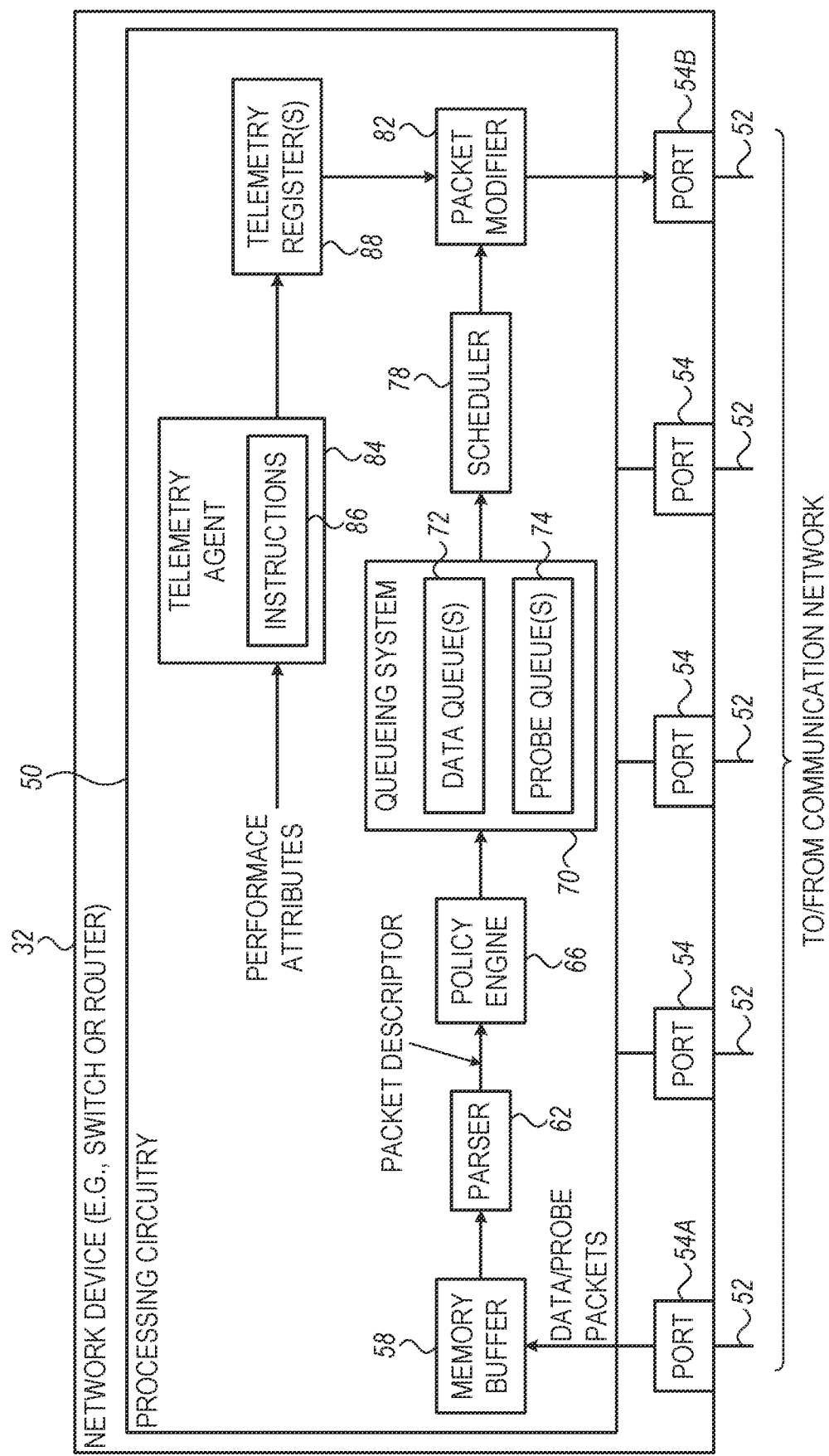
FIG. 2 is a block diagram that schematically illustrates a network device implementing low-latency delivery of in-band telemetry data, in accordance with an embodiment that is described herein.

FIG. 2 is a block diagram that schematically illustrates a network device implementing low-latency delivery of in-band telemetry data, in accordance with an embodiment that is described herein.

The network device of FIG. 2 can be used, for example, as network device 32 of FIG. 1. In this example, network device 32 of FIG. 2 is assumed to function as a network switch.

In FIG. 2, switch 32 comprises processing circuitry 50 and multiple ports 54. Ports 54 of switch 32 connect to communication network 28 (e.g., to ports of other switches or nodes), using suitable physical links 52. In the example of FIG. 2, a port 54A and a port 54B among ports 54 are serving respectively as an input port and as an output port, for receiving packets from and transmitting packets to the communication network. In the present example, data packets and probe packets that originate by source node 24A and are addressed to destination node 24B are received from the communication network via input port 54A and are sent back to the communication network via output port 54B.

Processing circuitry 50 receives data packets and probe packets via input port 54A and stores the received packets in a memory buffer 58 (e.g., a shared memory buffer). A parser 62 parses each received packet based on one or more headers of the packet, and produces for the packet a corresponding packet descriptor. Based on classification information embedded in the packets' headers, parser 62 distinguishes between data packets and probe packets. In an embodiment, the parser marks probe packets in their respective packet descriptors.

A policy engine 66 performs to at least part of the packets various processing, e.g., verifying the correctness of the data in the packet payload, packet classification and prioritization, and routing. The policy engine typically checks certain fields in the packets' headers (or in the packets' descriptors) for the purpose of packet classification and routing. The header fields contain addressing information, such as source and destination addresses and port numbers, and the underlying network protocol used.

A queuing system 70 queues processed packets that are pending transmission. In some embodiments, for one or more output ports (e.g., port 54B), queuing system 70 respectively comprises multiple queues of different respective priorities. In FIG. 2, queueing system 70 comprises for output port 54B a data queue 72 for storing data packets and a separate probe queue 74 for storing probe packets, wherein the probe queue is assigned a higher priority than the data queue. In some embodiments, probe queue 74 stores only probe packets and not data packets.

A scheduler 78 schedules transmission of queued packets toward respective ports 54 to which the packets are addressed. In the present example, scheduler 78 schedules transmission of data packets from data queue 72 and schedules transmission of probe packets from probe queue 74, both toward output port 54B, wherein the probe packets are scheduled transmission with higher priority than the data packets.

A packet modifier 82 modifies packets being transmitted via output port 54B. Other ports 54 may have other respective packet modifiers similar to modifier 82 (not shown). In some embodiments, packet modifier 82 modifies probe packets being transmitted via output port 54B, so as to carry telemetry data collected by the switch based on a processing path traversed by the data packets that are queued in data queue 72.

In some embodiments, processing circuitry 50 comprises a telemetry agent 84, configured to collect telemetry data based on processing path traversed by data packets as described above. In some embodiments, the telemetry agent collects telemetry data in accordance with telemetry collection instructions 86 that were pre-provisioned to the switch. Alternatively or additionally, the telemetry agent collects telemetry data in accordance with collection instructions that are carried in one or more probe packets. Telemetry agent 84 may collect telemetry data by accessing any suitable processing element along the processing path in the switch between input port 54A and packet modifier 82.

Telemetry agent 84 may collect any suitable type of telemetry data, e.g., telemetry data that is indicative of various performance attributes, such as, for example, ingress timestamps of the data packets, egress timestamps of the data packets, occupancy of the data queue, congestion status of the data queue, amount of data transmitted via the output port, and transmission rate via the output port.

In some embodiments, telemetry agent 84 stores telemetry data collected by the switch in on or more telemetry registers 88. When a probe packet is being transmitted via output port 54B, packet modifier 82 reads telemetry data from the relevant telemetry register(s) and adds the telemetry data to the probe packet. Using the telemetry registers, telemetry data related to packets queued in one queue (e.g., data packets queued in data queue 72) can be added to packets that are queued in another queue (e.g., probe packets queued in probe queue 74).

The configurations of communication system 20 in FIG. 1 and of network device 32 in FIG. 2 are example configurations, which are chosen purely for the sake of conceptual clarity. In alternative embodiments, any other suitable communication system and network device configurations can also be used. The different elements of network device 32 may be implemented in hardware, such as using one or more Application-Specific Integrated Circuits (ASICs) or Field-Programmable Gate Arrays (FPGAs). In alternative embodiments, some elements of network device 32, e.g., processing circuitry 50, may be implemented in software executing on a suitable processor, or using a combination of hardware and software elements.

Elements that are not necessary for understanding the principles of the present application, such as various interfaces, addressing circuits, timing and sequencing circuits and debugging circuits, have been omitted from FIGS. 1 and 2 for clarity.

In some embodiments, processing circuitry 50 may comprise a general-purpose processor, which is programmed in software to carry out the network device functions described herein. The software may be downloaded to the processors in electronic form, over a network, for example, or it may, alternatively or additionally, be provided and/or stored on non-transitory tangible media, such as magnetic, optical, or electronic memory.

Memory buffer 58 may comprises any suitable type of a memory, such as, for example, a Random-Access Memory (RAM).

In the context of the present patent application and in the claims, the term "processing circuitry" refers to all of the elements of network device 32 excluding ports 54. In the example of FIG. 2, processing circuitry 50 comprises memory buffer 58, parser 62, policy engine 66, queueing system 70, scheduler 78, packet modifier 82, telemetry agent 84 and telemetry registers 88.

A Method for Low-Latency Delivery of In-Band Telemetry Data

Figure 3:
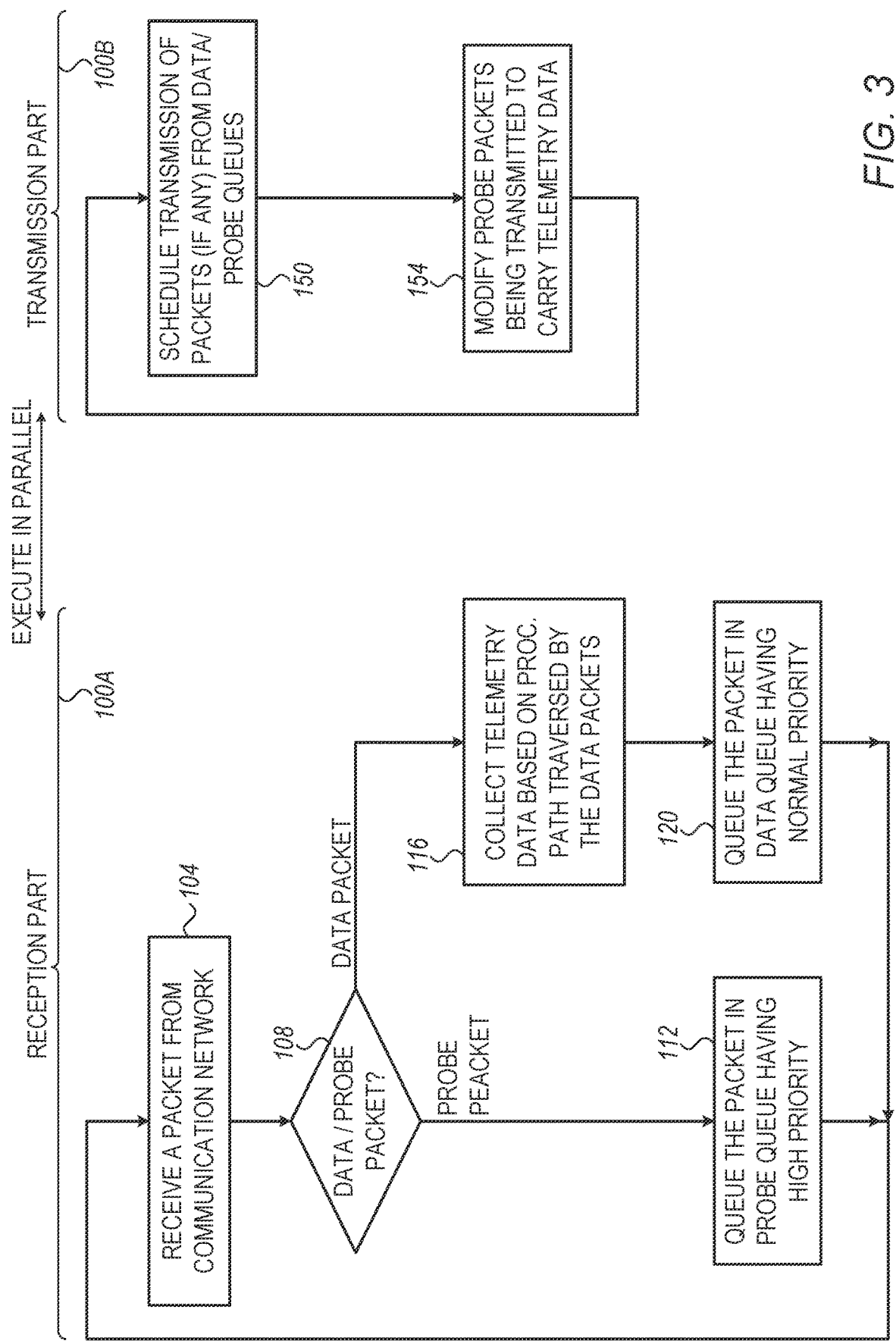
FIG. 3 is a flow chart that schematically illustrates a method for low-latency delivery of in-band telemetry data, in accordance with an embodiment that is described herein.

FIG. 3 is a flow chart that schematically illustrates a method for low-latency delivery of in-band telemetry data, in accordance with an embodiment that is described herein.

The method will be described as executed by processing circuitry 50 of network device 32. The method comprises a reception part 100A and a transmission part 100B.

The reception part (100A) begins at a packet reception step 104, with processing circuitry 50 receiving a packet via input port 54A. Parser 62 parsers one or more headers of the packet and identifies the type of the packet, e.g., whether the received packet comprises a data packet or a probe packet. At a query step 108, the processing circuitry (e.g., using policy engine 66) checks, e.g., based on the parsing outcome, whether the received packet comprises a data packet or a probe packet. When at step 108 the packet comprises a probe packet, the processing circuitry queues the probe packet is probe queue 74 having a high priority, at a probe packet queueing step 112. When at step 108 the packet comprises a data packet, telemetry agent 84 collects telemetry data, along the processing path that the packet traverses within the network device, at a telemetry data collection step 116, and queues the data packet in data queue 72 having normal priority that is lower than the priority of the probe queue, at a data packet queueing step 120. Following step 112 or 120, the method (part 100A) loops back to step 104 to receive a subsequent packet.

The transmission part (100B) begins at a scheduling step 150, with processing circuitry 50 scheduling (e.g., using scheduler 78) transmission of data packets from data queue 72 and of probe packets from probe queue 74, via output port 54B. The scheduler transmits via output port 54B probe packets with a higher priority than data packets. Consequently, even when the data queue fills up, causing delay in transmitting the queued data packets, probe packets are transmitted quickly without being subjected to long delays as the data packets.

At a packet modification step 154, packet modifier 82 modifies one or more probe packets, so as to carry telemetry data collected by the telemetry agent, e.g., at step 116, as described above. Following step 154, the method (part 100B) loops back to step 150 to schedule transmission of subsequent queued packets.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   a plurality of ports, to connect to a communication network; and
   processing circuitry, to:
   receive, via an input port among the plurality of ports, data packets and probe packets that are addressed to a common output port among the plurality of ports;
   store the data packets in a first queue and store the probe packets in a second queue different from the first queue, wherein both the first queue and the second queue are served by the output port;
   produce telemetry data that is (i) related to a processing path traversed by the data packets queued in the first queue and (ii) to be carried by probe packets queued in the second queue, the telemetry data being indicative of a state of the network device, based on the processing path that the data packets traverse within the network device;
   schedule transmission of the data packets from the first queue at a first priority, and schedule transmission of the probe packets from the second queue at a second priority higher than the first priority; and
   modify one or more of the scheduled probe packets, queued in the second queue, so as to carry at least part of the telemetry data related to the processing path traversed by the data packets queued in the first queue.

2. The network device according to claim 1, wherein the processing circuitry is to store in the second queue only probe packets and not data packets.

3. The network device according to claim 1, wherein the processing circuitry is to produce the telemetry data by monitoring one or more performance attributes selected from a list comprising: ingress timestamps of the data packets, egress timestamps of the data packets, occupancy of the first queue, congestion status of the first queue, amount of data transmitted via the output port, and transmission rate via the output port.

4. The network device according to claim 1, wherein the processing circuitry is to store the produced telemetry data in one or more registers, and to modify the probe packets based on the telemetry data stored in the one or more registers.

5. The network device according to claim 1, wherein the data packets and the probe packets originate from a source node upstream from the network device and addressed to a destination node downstream from the network device, and wherein the processing circuitry is to add the produced telemetry data to the probe packets traversing a network path from the source node to the destination node.

6. The network device according to claim 5, wherein the processing circuitry is to produce the telemetry data so as to be used by the destination node for producing feedback data that the destination node sends to the source node over the communication network, for controlling a rate of injecting data, by the source node, into the communication network.

7. The network device according to claim 1, wherein the processing circuitry is to be pre-provisioned with telemetry collection instructions, and to produce the telemetry data based on the telemetry collection instructions.

8. The network device according to claim 1, wherein the processing circuitry is to produce the telemetry data based on telemetry instructions carried in one or more of the received probe packets.

9. The network device according to claim 1, wherein the processing circuitry is to modify a given probe packet among the one or more of the probe packets, by modifying the given probe packet while being transmitted toward the output port.

10. The network device according to claim 1, wherein the processing is configured to modify a given probe packet among the one or more of the probe packets, by adding the telemetry data to a header part or to a payload part of the given packet.

11. A method, comprising:
    in a network device that comprises a plurality of ports for connecting to a communication network,
    receiving, via an input port among the plurality of ports, data packets and probe packets that are addressed to a common output port among the plurality of ports;
    storing the data packets in a first queue and storing the probe packets in a second queue different from the first queue, wherein both the first queue and the second queue are served by the output port;
    producing telemetry data that is (i) related to a processing path traversed by the data packets queued in the first queue and (ii) to be carried by probe packets queued in the second queue, the telemetry data being indicative of a state of the network device, based on the processing path that the data packets traverse within the network device;
    scheduling transmission of the data packets from the first queue at a first priority, and scheduling transmission of the probe packets from the second queue at a second priority higher than the first priority; and modifying one or more of the scheduled probe packets queued in the second queue, so as to carry at least part of the telemetry data related to the processing path traversed by the data packets queued in the first queue.

12. The method according to claim 11, wherein storing the probe packets in a second queue comprises storing in the second queue only probe packets and not data packets.

13. The method according to claim 11, wherein producing the telemetry data comprises producing the telemetry data by monitoring one or more performance attributes selected from a list comprising: ingress timestamps of the data packets, egress timestamps of the data packets, occupancy of the first queue, congestion status of the first queue, amount of data transmitted via the output port, and transmission rate via the output port.

14. The method according to claim 11, and comprising storing the produced telemetry data in one or more registers, and wherein modifying the probe packets comprises modifying the probe packets based on the telemetry data stored in the one or more registers.

15. The method according to claim 11, wherein the data packets and the probe packets originate from a source node upstream from the network device and addressed to a destination node downstream from the network device, and comprising adding the produced telemetry data to the probe packets traversing a network path from the source node to the destination node.

16. The method according to claim 15, wherein producing the telemetry data comprises producing the telemetry data so as to be used by the destination node for producing feedback data that the destination node sends to the source node over the communication network, for controlling a rate of injecting data, by the source node, into the communication network.

17. The method according to claim 11, and comprising pre-provisioning the network device with telemetry collection instructions, and wherein producing the telemetry data comprises producing the telemetry data based on the telemetry collection instructions.

18. The method according to claim 11, wherein producing the telemetry data comprises producing the telemetry data based on telemetry instructions carried in one or more of the received probe packets.

19. The method according to claim 11, wherein modifying the probe packets comprises modifying a given probe packet among the one or more of the probe packets, by modifying the given probe packet while being transmitted toward the output port.

20. The method according to claim 11, wherein modifying the probe packets comprises modifying a given probe packet among the one or more of the probe packets, by adding the telemetry data to a header part or to a payload part of the given packet.

21. A method, comprising:

in a network device that connects to a communication network using ports, receiving, via an input port, data packets and probe packets that are addressed to a common output port;

storing the data packets in a data queue and storing the probe packets in a probe queue, wherein both queues are served by the output port;

producing telemetry data that is (i) related to a processing path traversed by the data packets queued in the first queue and (ii) to be carried by probe packets queued in the second queue, the telemetry data reporting a state of the network device, based on a processing path that the data packets traverse in the network device from the input port to the output port;

scheduling transmission of the data packets from the data queue and of the probe packets from the probe queue so that the probe packets are transmitted via the output port at a higher priority than the data packets; and modifying one or more of the scheduled probe packets queued in the probe queue to carry at least part of the telemetry data related to the processing path traversed by the data packets queued in the data queue.

* * * * *